United States Patent [19]

Olabisi

[11] 4,234,642

[45] * Nov. 18, 1980

[54] MOLDED PLASTIC STRUCTURAL WEB ARTICLES

[75] Inventor: Olagoke Olabisi, Plainfield, N.J.

[73] Assignee: Union Carbide Corporation, New York, N.Y.

[*] Notice: The portion of the term of this patent subsequent to Jan. 23, 1996, has been disclaimed.

[21] Appl. No.: 968,027

[22] Filed: Dec. 8, 1978

Related U.S. Application Data

[63] Continuation-in-part of Ser. No. 936,056, Aug. 23, 1978, which is a continuation of Ser. No. 705,101, Jul. 14, 1976, Pat. No. 4,136,220.

[51] Int. Cl.$^2$ ............................ B32B 3/30; B29H 7/02
[52] U.S. Cl. ................................... 428/188; 264/572; 264/574; 428/36
[58] Field of Search ......... 264/572, 574, 51, DIG. 83; 428/35, 36, 188

[56] References Cited

U.S. PATENT DOCUMENTS

| | | | |
|---|---|---|---|
| 3,940,467 | 2/1976 | Brachman | 264/DIG. 83 |
| 4,101,617 | 7/1978 | Friederich | 264/572 |
| 4,136,220 | 1/1979 | Olabisi | 428/35 |

FOREIGN PATENT DOCUMENTS

| | | |
|---|---|---|
| 2461580 | 7/1975 | Fed. Rep. of Germany ... 264/DIG. 83 |
| 2800482 | 7/1978 | Fed. Rep. of Germany ... 264/DIG. 83 |

*Primary Examiner*—William R. Dixon, Jr.
*Attorney, Agent, or Firm*—Gerald R. O'Brien, Jr.

[57] ABSTRACT

A process is disclosed for the production of molded tubular structural web articles of thermoplastic material comprising the steps: passing molten plastic material into a tubular mold cavity to fill a substantial portion of said cavity; injecting a low viscosity pressurizing fluid into said material in said mold cavity; coordinating the fluid flow rate, pressure, temperature and plastic material volume so that the pressurizing fluid divides into at least two streams on entering said material without causing the low viscosity pressurizing fluid to break through said material flow front so that, when pairs of melt fronts merge, a molded tubular structural web article is formed having a solid web at each point of merger; and maintaining a positive pressure in the mold cavity after pressurizing until said tubular article is self-supporting. The resulting tubular structural web articles are also disclosed.

2 Claims, 3 Drawing Figures

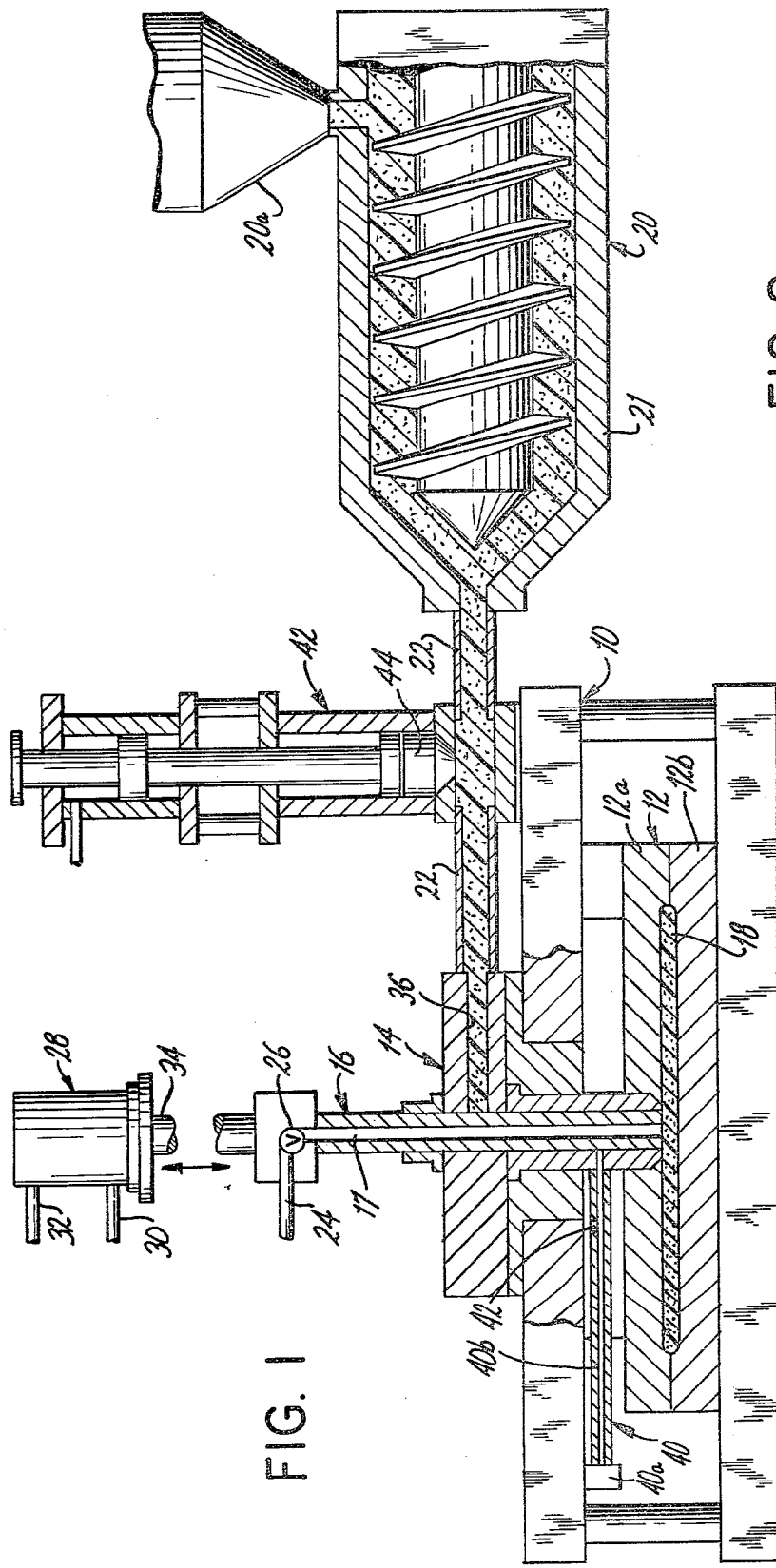
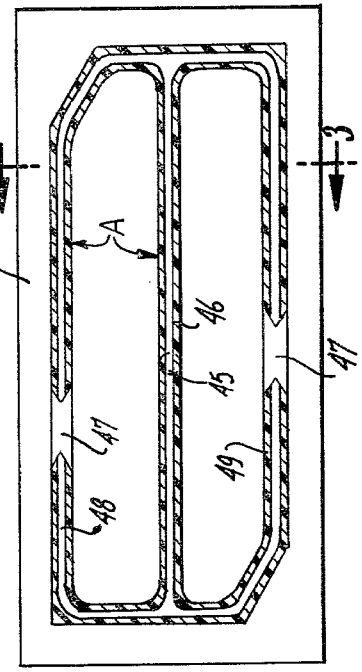
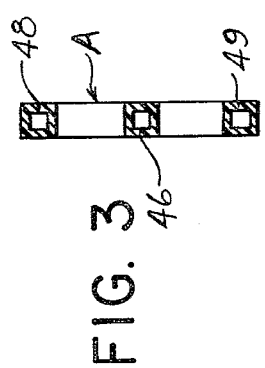
FIG. 1
FIG. 2
FIG. 3

MOLDED PLASTIC STRUCTURAL WEB ARTICLES

This is a continuation-in-part of my prior copending patent application Ser. No. 936,056 filed Aug. 23, 1978 and entitled "Process for the Molding of Plastic Structural Web and the Resulting Articles" which is, in turn, a continuation of my prior copending patent application Ser. No. 705,101 filed July 14, 1976 and entitled "Process for the Molding of Plastic Structural Web and the Resulting Articles", now U.S. Pat. No. 4,136,220.

The present invention relates to novel plastic structural web articles.

Heretofore, many attempts have been made to provide processes for the production of structural plastic articles employing less than a full density of plastic material, yet producing articles having structural properties which exceed even those of solid (full density) plastic material articles of the same weight.

The most notable of such prior processes are those provided for the production of structural foam. The Society of the Plastics Industry, on page 2 of its booklet "Structural Foam", defines such resultant structural foam article "as a plastic product having integral skins, cellular core and having a high enough strength-to-weight ratio to be classed as 'structural'".

Such structural foam process and the resulting article is typified by those of the teachings of U.S. Pat. Nos. 3,268,636 and 3,436,446 to Richard G. Angell, Jr.

The continuing objective of the plastic molding art is the provision of processes for the production of novel articles of higher flexural modulus than obtainable for an identical density structural foam article, such novel articles also having lower densities than solid articles of the same outer shape and composition. A process is provided for the production of molded tubular structural web articles of thermoplastic material comprising the steps: passing molten plastic material into a tubular mold cavity to fill a substantial portion of said cavity; injecting a low viscosity pressurizing fluid into said material in said mold cavity; coordinating the fluid flow rate, pressure, temperature and plastic material volume so that the pressurizing fluid divides into at least two streams on entering said material without causing the low viscosity pressurizing fluid to break through said material flow front so that, when pairs of melt fronts merge, a molded tubular structural web article is formed having a solid web at each point of merger; and maintaining a positive pressure in the mold cavity after pressurizing until said tubular article is self-supporting.

It is believed that, when the process is preferably carried out in a mold having a mold cavity wherein the major portion thereof defines a volume having a length at least ten times the width and depth thereof (thereby forming articles having channels with lengths at least ten times their width and depth), the phenomenon otherwise expected to be carried out by the process in a mold cavity having a length of the order of magnitude of its width and depth is modified. This modification in effect reduces the incidence of web formation and the production of multiple webs many of which are discontinuous and oriented in direction, as described and claimed in my prior copending patent application Ser. No. 936,056 filed Aug. 23, 1978 and entitled "Process for the Molding of Plastic Structural Web and the Resulting Articles".

The novel resulting structural web tubular or channeled article of the invention comprises an integral body of plastic material having an outer skin and at least one continuous hollow internal tube duct or channel positioned therein separated by at least one skin-connecting solid web, and it is in this sense that the term "tubular structural web" body or article is employed herein. The cross-section of the tubular or channeled article may be circular, elliptical or the like, as determined by the cross-sectional nature of the mold channel (cavity) in which it is formed.

As employed herein, "plastic material" is understood to mean any plastic material composition which exhibits plastic flow properties under the temperature and pressure conditions employable in the present invention in connection with extrusion, mixing and molding. Thus, the terms "plastic material" and "thermoplastic material" are understood to include all organic and inorganic materials having, with or without additives, thermoplastic characteristics and capable of being extruded, mixed and molded under such temperature and pressure conditions at which they exhibit relatively high viscosity characteristics. Certain synthetic organic resins, such as polyethylene, polystyrene, polysulfone, ethylene-vinyl acetate polymers, polyvinyl chloride and the like, even when possessing high filler addition, are widely recognized as possessing thermoplastic characteristics. Other resins, such as phenolic resins, are widely accepted as thermosetting resins. It is, however, to be noted that such resins do exhibit thermoplastic characteristics until they are reacted at a temperature and for a time sufficient to produce the cross-linking necessary to cause them to be considered as substantially thermoset. Therefore, it is to be understood that such uncross-linked thermosettable materials are to be regarded as "plastic material" and "thermoplastic material" within the scope of the present invention.

"High viscosity" is understood to mean a viscosity greater than about 1000 centipoises.

As employed herein, the term "low viscosity pressurizing fluid" is understood to mean normally gaseous as well as liquid pressurizing fluids. Examples of such gaseous fluids are argon, nitrogen, carbon dioxide, air, methyl chloride, propylene, butylene and gaseous fluorocarbons. Examples of such liquid fluids are pentane, water and liquid fluorocarbons. It is to be understood that such "low viscosity pressurizing fluid" is either not reactive with the plastic material under the pressure and temperature conditions employed in the process of the invention or if reactive the reaction does not occur with such speed as to completely prevent fluidity.

"Low viscosity" is understood to mean a viscosity up to about several centipoises, it being understood that the ratio of viscosity of the high viscosity plastic material to that of the low viscosity pressurizing fluid is higher than 10:1.

As employed herein, the terms "generally continuous tubular" articles, "tubular structural web" articles and "channeled structural web" articles refer to structural web articles whose length is at least ten times the width and depth thereof, having at least one injection point and having at least one skin-connected web.

It has been found, in the practice of the process, that the following process variables are determinative of the attainment of the desirable novel tubular structural web thermoplastic article:

(a) Mold cavity volume;
(b) Flow length-to-perimeter ratio;

(c) Plastic material volume;
(d) Plastic material density;
(e) Plastic material viscosity;
(f) Plastic material elasticity;
(g) Pressurizing fluid flow rate;
(h) Pressurizing fluid pressure;
(i) Pressurizing fluid density;
(j) Pressurizing fluid viscosity; and
(k) Pressurizing fluid—plastic material interfacial tension.

The value of these variable process parameters must be coordinated, in accordance with the invention and the knowledge of those skilled in the art, to cause the pressurizing fluid to penetrate into said plastic material and cause it to assume the contour of said mold cavity, thereby forming a molded structural web tubular article without causing the low viscosity pressurizing fluid to break through the plastic flow front and prevent the plastic from substantially completely assuming the contour of said mold cavity. The term "substantially completely assume the contour of said mold cavity" is employed to indicate that a relatively small outlet passage may desirably be provided into a mold cavity by the provision of at least one small outlet in the walls of the mold cavity at desired points.

It is further understood that the volume of the selected mold cavity need not be fixed at that value enclosed within the mold halves. For example, an initially fixed pair of mold halves may be expanded by the pressurizing fluid to a volume exceeding the initially enclosed volume. Alternatively, moveable mold walls may be provided for increasing the mold volume from that initially employed at the beginning of the plastic material injection and pressurizing operation.

In the practice of the process to produce articles of the invention, a quantity of plastic material is fed into the mold cavity which is preferably maintained at ambient temperature.

The mold cavity volume and configuration is determined by the shape and size of the tubular structural web article to be produced by the process of the invention. The flow length-to-perimeter ratio of the mold cavity is determined by the shape (geometry) of the mold cavity.

The plastic material volume is metered to fill the interior of the mold cavity upon later full expansion of such plastic material by the pressurizing fluid to assume the contour of the walls of the mold cavity and produce the desired tubular structural web article. For given operating conditions of temperature and pressure, the plastic material density, viscosity and elasticity are determined by the selection of plastic material employed in accordance with strength and other desired physical and/or chemical characteristics of the resulting structural web product desired. The plastic material density, viscosity and elasticity are, however, parameters to be seriously considered in the practice of the process of the invention although they are predetermined upon the selection of the plastic material.

The pressurizing fluid flow rate is a very significant parameter in the process of the present invention as is the pressurizing fluid pressure. For given operating conditions of temperature and pressure the pressurizing fluid density and viscosity are predetermined upon selection of a desirable pressurizing fluid as in the case of the plastic material selection being determinative of its density, viscosity and elasticity. However, far more latitude is permissible in the selection of pressurizing fluid.

The selection of a specific pressurizing fluid and a plastic material for the practice of the process of the invention are quite important in determining a critical variable in the practice of the process, i.e., the fluid-plastic interfacial tension. It is to be understood that an interfacial tension will exist between two fluid phase systems as long as the systems are different (chemically and/or physically).

Accordingly, after passing a body of plastic material into the mold cavity, the relatively low viscosity pressurizing fluid is injected through at least one point into the plastic material so that the fluid-plastic flow front divides into at least two streams. Then, as the process variables discussed above are coordinated, the pressurizing fluid causes the plastic material fronts to flow to assume the contour of the walls of the mold cavity without causing the low viscosity pressurizing fluid to break through said flow front so that when pairs of melt fronts merge, a molded structural web article is formed having a solid web at each point of merger.

The resulting novel article is a hollow plastic material article having an outer skin and a generally continuous tubular or channeled center and positioned therein at least one skin-connecting web. Such novel article is produced by a proper coordination of the process variables, namely, viscosities, elasticities, pressure and/or velocity or flow rate, interfacial tension, mold cavity perimeter, mold cavity length and plastic volume.

In the drawing:

FIG. 1 is an elevational schematic view, partially in section, of apparatus capable of producing the novel tubular structural web articles;

FIG. 2 is a top sectional view of a molded tubular structural web article of the invention supported in the lower mold half of the mold of FIG. 1; and FIG. 3 is a sectional view of the article of FIG. 2 taken along the line 3—3' thereof.

Referring specifically to the drawings, apparatus suitable for producing the articles of the invention is shown schematically in the embodiment of the drawings wherein press 10 supports mold 12 and plastic material is introduced through manifold 14 to the mold cavity 18 and pressurizing fluid is introduced through hollow nozzle rod 16 into the plastic material. The plastic material is fed from a feeding device 20 which may comprise a high shear melting extruder, an extruder-accumulator combination (as shown and as employed in the structural foam process), a ram-type injection cylinder-accumulator combination or conventional injection molding equipment which comprises a heating extruder having an injection molding chamber therein, wherein melting and accumlation of the plastic are both effected.

As shown in the embodiment of FIG. 1 an extruder and accumulator, of the type employed in the injection molding of structural foam, were employed as the plastic material feeding device 20. Solid plastic particles may be fed to the hopper 20a of extruder 21 for the plasticating of plastic material. The plastic particles are rendered molten in the extruder 21 by action of the extruder screw 21a and barrel walls 21b (and by the addition of further external heat, if desired). The molten plastic material 38, so formed, is then fed through a conduit 22 to an accumulator 42 having moving piston member 44 to provide an expandable chamber (not shown in position of FIG. 1) for receiving the plastic material 38 therein before passage through manifold passage 36 toward the hollow nozzle rod assembly 16. By the employment of an extruder-accumulator of the structural foam injection molding type, molten plastic material 38 is feedable to the manifolding system 14 from which it is delivered to the mold 12 through nozzle rod assembly 16.

Specifically, the plastic material 38 is fed from feeding device 20 through conduit 22 to manifold 14. Pressurizing fluid is fed through inlet conduit 24 to the interial conduit 17 of hollow nozzle rod 16 and controlled by suitable valving means 26.

Pneumatic actuator 28 having fluid inlet and outlet ports 30 and 32 is mechanically connected through shaft 34 to the hollow nozzle rod assembly 16 which is moveably positioned so as to be raised and lowered within manifold member 14.

As shown in FIG. 1, plastic conduit 22 and manifold passage 36 are filled with molten plastic material. Mold cavity 18 is partially filled with plastic material 38. Hollow nozzle rod assembly 16 has been lowered by actuation of pneumatic actuator 28 through shaft 34 to interrupt the flow of plastic through manifold passage 36 and to position the lower end of the hollow nozzle rod 16 close to or within the mold cavity where the pressurizing phase of the process may be commenced.

The low viscosity pressurizing fluid is admitted by actuation of valve means 26 to introduce the fluid through conduit 17 into the plastic material body 38 within the mold cavity 18. The plastic material, upon pressurization, assumes the contour of the walls of the mold cavity and produces the tubular structural web article of the invention A as defined by the mold cavity walls. The tubular web article has an outer skin and a continuous internal tubular channel terminating at each end in at least one skin-connecting web.

The pressure is maintained on the pressurizing fluid until the tubular structural web article so produced is self-supporting. Thereupon, valve means 26 is actuated to close fluid flow and hollow nozzle rod 16 is retracted above rod valve means 40 by pneumatic actuator 28 and actuator 40a retracts rod valve means 40b to open venting port 42 and permit the venting of the pressurizing fluid from the molded article within the mold cavity 18.

The extruder employed in the apparatus for carrying out the process of the invention preferably comprises a single screw extruder having a two-stage screw and providing a pressure maximum in its middle to inhibit the backflow of material and any contained gaseous phase.

EXAMPLE

In an example of the production of articles of the present invention, 3.98 pounds of general purpose unmodified crystal polystyrene pellets having a solid density of 1.05 g/cm$^3$ at 77° F. and an extrusion plastometer of 750.0 g/min. were fed into the hopper of a two-stage extruder as shown in FIG. 1 of the drawing. The extruder contained a 2½" diameter screw with L:D=24:1, a metering depth of 0.110" in the first stage and 0.135" in the second stage and a compression ratio of 4/1 in the first stage and 3.26/1 in the second stage. The resin was plasticated by the extruder screw running at 40.0 revolutions/min. and conveyed to an accumulator of the type shown in FIG. 1 having a total volume of 460 cubic inches.

From the partially filled accumulator, the resin was shot at a temperature of 475° F., into a mold cavity of the configuration indicated in FIG. 2 of the drawing. The plastic volume was 95.71 cubic inches based on the solid density of polystyrene at 77° F. The mold was maintained at 65° F.

Nitrogen gas was injected into the mold at a pressure of 600 psi. The mold was cooled and the gas pressure was released when the molded article was self-supporting.

As shown in FIGS. 2 and 3 of the drawing, the resultant tubular structural web article is supported in section in the open lower mold half 12b. The plastic material as shown in FIG. 1 is in the molten state and, as such is depicted with added dotted symbol to so distinguish it. The resultant tubular structural web article shown in FIGS. 2 and 3 has cooled to solid state form and is depicted without such additional dotted symbol.

Article A is a tubular or channeled article, generally rectangular in plan view shape and having overall dimensions of 31.5 inches by 13.5 inches by 2 inches thick by one inch deep. The article was produced by single point injection molding and showed an injection port hole at 45 in its central leg 46. The tubular structural web article A had a specific gravity of about 0.60, as compared to a solid plastic article of the same material and dimensions having a specific gravity of about 1.05. A solid web 47 of solid plastic material was formed in each of the upper and lower tubular legs 48 and 49 at points generally most remote from the injection point in central leg 46. The legs were all generally rectangular in cross-section, as shown in FIG. 3 of the drawing. These webs were formed by the junction of pairs of plastic material fronts moving from the injection point by the pressurizing fluid.

The mold depth is 1.0 inch and the legs are 1.5 inches in width. The total volume of the entire mold cavity was 167.5 cubic inches.

Tubular structural web articles may find application as tubular structures for institutional and outdoor furniture, handrails, gratings, ladders, racks, and the like; pipe and plumbing fittings, including elbows, tees, couplings, and sink traps, and other plumbing items and the like.

What is claimed is:

1. In a structural web article of thermoplastic material having a substantially continuous enveloping skin around the exterior of said article, at least one generally continuous, hollow center therein, at least one integral skin-connecting web positioned in said hollow center and at least one entry passage from the exterior to the hollow center(s) of said article through said enveloping skin, the improvement which comprises an article having at least two tubular channels each having hollow center(s) passing therethrough, said center(s) each originating at said entry passage and terminating at said web, the length of said tubular channels being at least ten times its width and depth dimensions.

2. The structural web article in accordance with claim 1, wherein said thermoplastic material is crystalline polystyrene.

* * * * *